ANCHORING PRESSURING APPARATUS FOR A DRILL

Original Filed Jan. 22, 1973 2 Sheets-Sheet 1

ANCHORING PRESSURING APPARATUS FOR A DRILL

Original Filed Jan. 22, 1973 2 Sheets-Sheet 2

United States Patent

Re. 28,449
Reissued June 10, 1975

28,449

ANCHORING AND PRESSURING APPARATUS FOR A DRILL

Tibor O. Edmond, Ponca City, Okla., by Continental Oil Company, Ponca City, Okla., assignee Original No. 3,827,512, dated Aug. 6, 1974, Ser. No. 325,773, Jan. 22, 1973. Application for reissue Sept. 3, 1974, Ser. No. 502,581.

Int. Cl. E21b *3/12;* E21c *19/00*

U.S. Cl. 175—94 13 Claims

Matter enclosed in heavy brackets [ ] appears in the original patent but forms no part of this reissue specification; matter printed in italics indicates the additions made by reissue.

ABSTRACT OF THE DISCLOSURE

An apparatus designed to hydraulically force a drill horizontally into a formation thereby drilling a borehole comprising a cylinder having enclosed ends with a pair of pistons axially positioned inside the cylinder. Each piston has a piston rod journaled in the end of the cylinder and projecting from the end. The apparatus for anchoring the cylinder against the borehole comprises a plurality of anchors which are slidably journaled both to the outside of the cylinder and to the piston rod. An anchor engaging and disengaging means is coupled between the anchors and the piston rod so that when the pistons are pushed apart by hydraulic fluid one set of anchors disengages from the wall and the other set of anchors engages the wall. Continued hydraulic pressure will then apply pressure against the drill column forcing the drill into the formation. When the maximum movement of the anchors has been reached, hydraulic fluid is then applied to the opposite sides of both pistons, whereupon one set of anchors which was engaged will become disengaged and retract while the other set of anchors which was disengaged will engage the borehole and apply application of hydraulic pressure against the drill column.

BRIEF DESCRIPTION OF THE INVENTION

This invention relates to an apparatus for nearly continuously driving a drill bit under hydraulic pressure against the formation causing the drill bit to form a borehole within. The invention essentially consists of a cylinder having two axially spaced pistons inside the cylinder and piston rods coupled to the cylinder and extending in opposite directions through the cylinder end plate. A pair of anchoring assemblies is journaled on the outside of the cylinder. Each anchoring assembly essentially comprises a ring which is free to slide along the cylinder outside surface, a second mounting which can be a disc which is free to slide on the piston rod and a rigid coupling between the ring and the disc. The rigid coupling consists of three pairs of spaced bars having a plurality of anchors journaled between the pairs of bars. The end of the anchor nearest the borehole is preferably serrated to better grip the borehole wall. The other end of the anchor is connected to an actuating rod which is journaled in both the disc and the ring. One end of the actuating rod is rigidly coupled to the end of the piston rod so that movement of the piston rod will cause the anchors to pivot, moving them into or out of engagement with the borehole wall. One set set of anchors will always have an engagment with the borehole wall while the other set is automatically positioned for engagement with the borehole wall when the cylinder has reached the limit of its movement. The entire system is operated by the proper application of hydraulic fluids under pressure either between the pistons on the one hand or on the opposite sides of the pistons on the other hand.

This invention has particular utility in the boring of horizontal holes where it is virtually impossible to apply pressure to a drill bit. The device of this invention not only will apply adequate pressure to a drill bit but also will provide a means for drilling long horizontal holes, for example, over 1,000 feet in length. The device is also easily applied to drill assemblies which are controlled by either internal sensing mechanisms or external methods whereby a drilling apparatus can penetrate coal veins, for example, at a selected depth in the coal vein for extremely long distances.

DISCUSSION OF THE PRIOR ART

The closest prior art to the device described in this application that is known to applicant is a device manufactured by Drilco Corporation of Midland, Tex. That device essentially comprises a hydraulic piston with two sets of borehole wall anchors. The device operates by pressuring the piston causing one set of borehole wall anchors to engage the wall. Increased pressure will drive the piston forward applying pressure to the drill stem. When the piston has reached its limit, the second set of anchors is pressurized forcing them against the borehole wall while the original set of anchors is disengaged. The piston assembly is then retracted to the new position of the second set of anchors whereupon the first set of anchors is then repressurized and the second set of anchors is retracted and the process is repeated.

In the above device during the retracting of the piston, no pressure is applied to the drill. Thus the drill time is reduced by the amount of time required to retract the first set of anchors and move the piston and anchor assembly to the new location. The device of this invention will continue pressure on the drill except for the brief period of time needed to transfer the flow of hydraulic fluid from between the pistons to the opposite side of the pistons, for example.

BRIEF DESCRIPTION OF THE FIGURES

Referring to the drawings.

DETAILED DESCRIPTION OF THE ANCHORING ASSEMBLY

Figures 1, 4, 5:
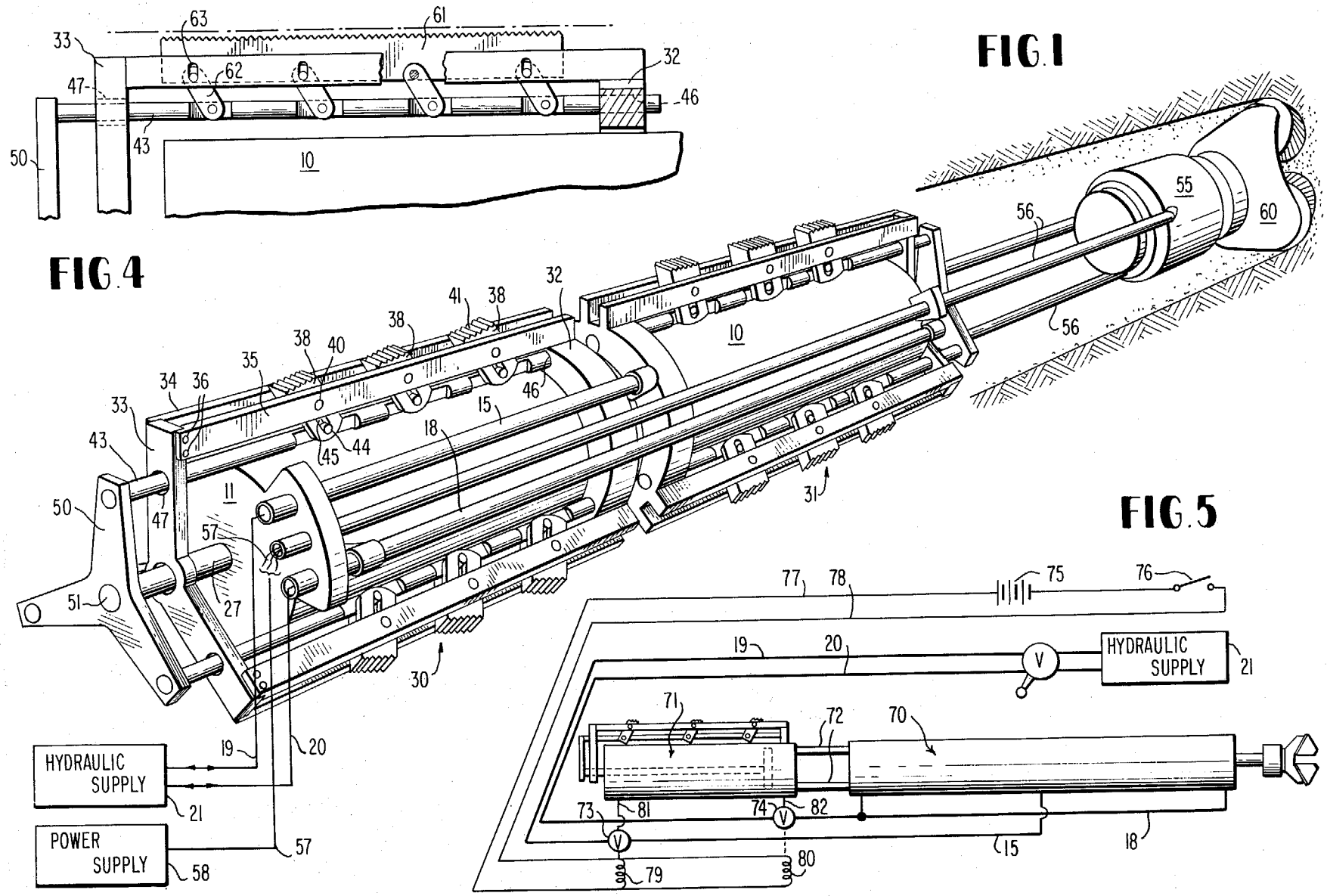
FIG. 1 illustrates a prospective view of the anchoring and pressure assembly and drilling assembly.
FIG. 4 is a modified anchor.
FIG. 5 is a schematic diagram illustrating a method for adding a third anchoring assembly so that the drill and associated apparatus can be backed from a borehole.
Figure 2:
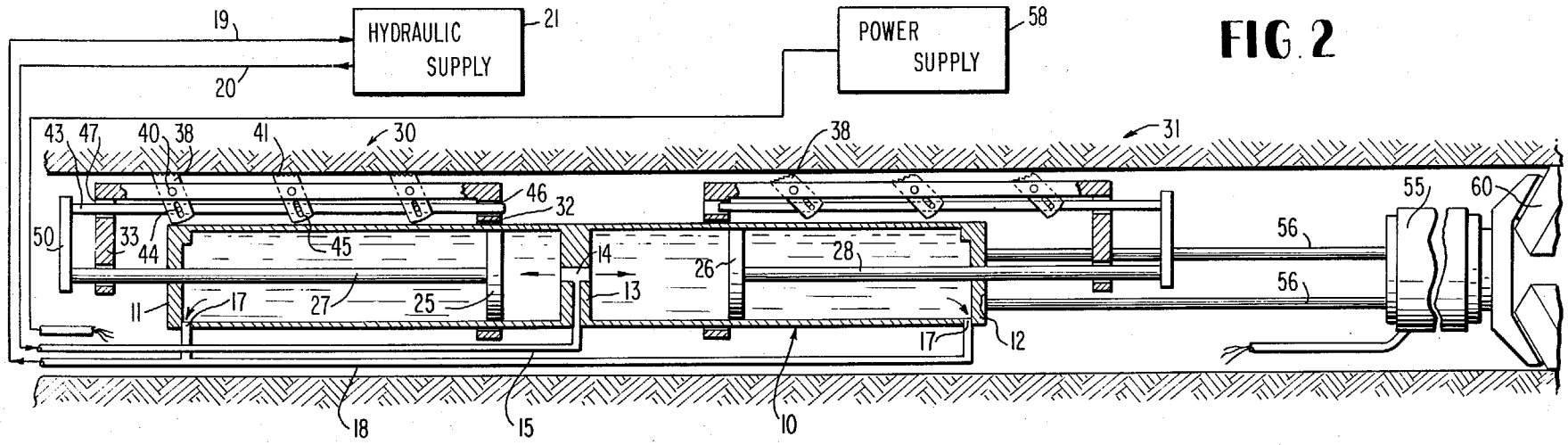
FIG. 2 is across sectional view of the anchoring assembly illustrating the operation of the assembly when the hydraulic fluid is applied between the pistons.
Figure 3:
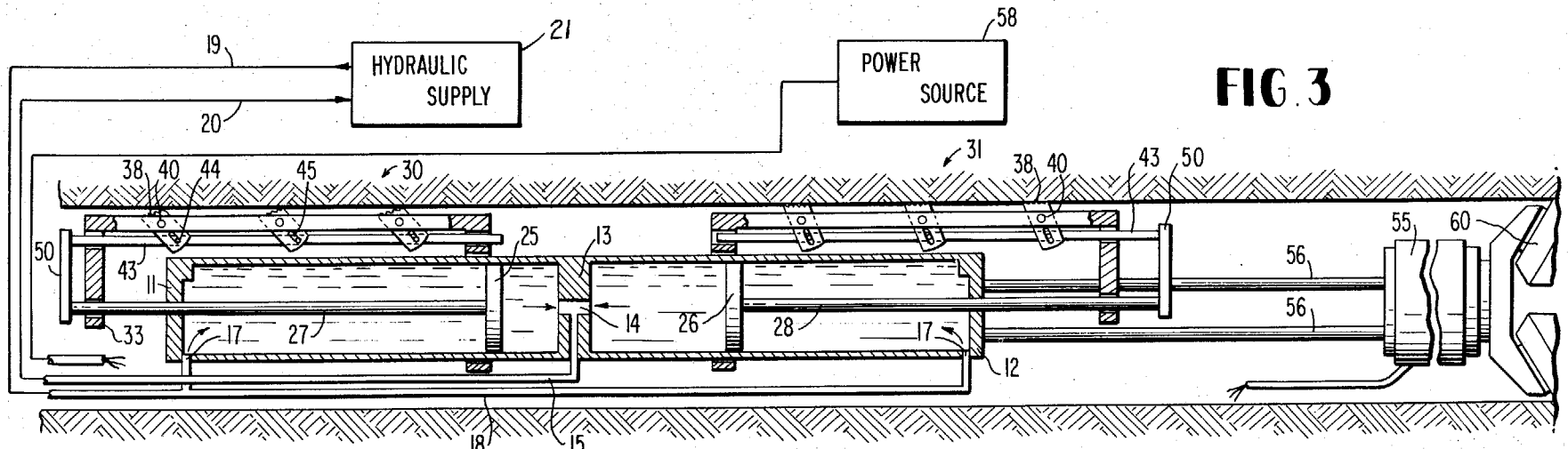
FIG. 3 illustrates the operation of the anchoring assembly when the hydraulic fluid is applied to opposite sides of the piston.

Referring to all of the figures but in particular to FIGS. 1 through 3, a continuous anchoring and pressure apparatus for a drill is illustrated and essentially comprises a cylinder 10 having a first end 11 and a second end 12. A partition 13 has a hydraulic port 14 connected to a hydraulic line 15. A second pair of ports 17 is connected to a hydraulic line 18. Hydraulic lines 15 and 18 are connected generally through flexible hoses 19 and 20 to a source of hydraulic fluid 21. The hydraulic supply 21 generally consists of a pump and a sump, neither of which are illustrated since they are well known in the art. Inside cylinder 10 is a pair of pistons 25 and 26. A pair of piston rods 27 and 28 are connected to pistons 25 and 26, respectively, and extend axially through ends 11 and 12, respectively. It is obvious that seals for the hydraulic fluid are necessary, but for the sake of simplicity are not illustrated. A pair of anchoring assemblies is mounted on the outside of the cylinder 10 and referred to by Nos. 30 and 31, respectively. Since both anchoring assemblies are essentially identical in their construction and their operation, only one anchoring assembly will be described. Referring to anchoring assembly 30, a ring-shaped mount 32 is slidably journaled over cylinder 10. A second Y-shaped mount 33 is journaled around piston rod 27 and free to slide along the piston rod. A rigid coupling means is attached between Y-shaped mount 33 and ring mount 32, and, in the embodiment illustrated, comprises a pair of parallel bars 34 and 35. Bars 34 and 35 can be attached to Y-shaped mount 34 by either screws 36, by welding, by rivets, or any other well-known means. Bars 34 and 35 can also be attached to ring mount 32 by the same means as its attachment to Y-shaped mount 33. A plurality of of anchors 38 is positioned between parallel rods 34 and 35 and rotatably attached through a pin 40. The position of the anchor closest to the borehole may have a plurality of serrations. The serrations provide an increased frictional service. Anchors 38 are moved into and out of engagment with the wall by means of an actuating assembly comprising a rod 43 which is coupled by a pin 44 through a slot 45. One end of rod 33 is journaled in an opening 46 in ring 32, and the other end of rod 33 is journaled in an opening 47 in Y-shaped mount 33. The extreme end of rod 43 is attached rigidly to a second Y-shaped mount 50. Y-shaped mount 50 is also rigidly attached at its center 51 to the end of piston rod 27. The attachment can be made in any usual way such as set screws, pins, welds, a screw and nut combination, or any other well-known method for rigidly attaching a flat surface to a rod. Both Y-shaped mounts 33 and 50 can have any ordinary configuration, for example, a disc. The particular shape was only selected for convenience.

The entire anchoring assembly consisting of cylinder 10 and assemblies 30 and 31 are coupled in any well-known fashion to an electric or hydraulic motor 55, such as rods 56. Spacing, however, must be left between assembly 31 and motor 55 to permit proper movement of assembly 31 as will be hereafter described. Rod 56 in the preferred embodiment is hollow and provides a channel for wires 57 between a source of power 58 and motor 55, which in the preferred embodiment is also electrical. Motor 55 is coupled through a shaft (not shown) to a drill 60. Referring to FIG. 4, the anchors 38 can be modified to form a single anchor 61 which can be coupled to rod 43 by a plurality of linkages 62. A slot 63 in parallel bars 34 and 35 converts the motion of rod 43 to a vertical motion of the anchor 61.

OPERATION

Referring in particular to FIGS. 2 and 3, the operation of the system will be described. When hydraulic pressure from supply 21 is applied through pipe 20 to pipe 15 and to port 14, pressure is applied between pistons 25 and 26 forcing the pistons away from each other. Piston 26 will travel until it reaches end 12. Hydraulic pressure then will increase forcing piston 25 in the direction away from piston 26 moving piston rod 27. The second Y-shaped mount 50 and actuaing rod 43 will move in the same direction since rod 43 is free to slide through the first Y-shaped mount and the ring-shaped mount 32. Anchors 38 will rotate about pivot 40 since pin 44 will engage anchors 38 in slot 45. Anchors 38 will rotate until they engage the borehole inner wall. Once anchored against the wall, piston rod 27 will no longer be free to move in the direction away from piston 26. The hydraulic pressure will then increase in the cylinder space between pistons 25 and 26 causing pressure against piston 26 which is pressing against end 12. The pressure against end 12 will be applied to rods 56, to drill motor 55, and drill 60. The pressure on drill 60 will cause the apparatus to drill into the formation.

As the drill works its way into the formation, cylinder 32 will advance in the direction of the drilling operation.

Since the anchors 38 are secured against the borehole wall, ring 32 along with piston 25 will gradually move toward end 11. Once it has reached the extreme, that is, once piston 25 has reached end 11, the hydraulic pressure will build up indicating to the operator that no movement of the drilling apparatus is any longer possible. Once this condition is reached, pressure in the the system is reversed so that pressure will now be applied to pipe 19 and drained through pipe 20 which will caue hydraulic fluid to enter ports 17 and drain through port 14. As pressure is applied in port 17, assembly 31 will have its piston 26 move in the direction of end 11 causing piston rod 28, second Y-shaped member 50, and actuating rod 43 to likewise move in the direction of piston 26. For the reasons previously given, the assembly 30 and the anchors 38 will rotate about pivot 40 and anchor against the borehole wall. When hydraulic pressure is applied, piston 25 will move toward end 12 taking its anchors 38 out of engagement since piston rod 27, second Y-shaped mount 50, and actuating rod 43 have all likewise moved in the direction of piston 25 causing pin 44 to engage slot 45 rotating anchors 38 about pin 40. Once piston 25 has moved against partition 13, hydraulic pressure will build up between piston 26 and wall 12 again applying pressure against wall 12 through rods 56 to motor 55 and drill 60.

From the above explanation it can be understood that except for the brief period of time necessary to repressure the chambers moving one piston and anchoring the other assembly, hydraulic pressure is always being applied to the cylinder and causing pressure to be applied to the drill bit. The above assembly, of course, will move in only one direction, namely in the direction the borehole is being drilled. It is contemplated that the device will normally be used to drill between two mine tunnels; therefore, removal back through the drilled hole would not be necessary. In case of other uses, however, the device can be backed out of the hole or removed in several ways, the first being to have attached to the device a cable so that it can be physically hauled out of the borehole while the apparatus is in a depressured state.

FIG. 5 illustrates a second means for removing the apparatus, the illustration being in block diagram form. The entire apparatus described in FIGS. 1, 2 and 3 is illustrated by cylinder 70. A second apparatus 71 is attached to apparatus 70 by any means such as rods 72. Apparatus 71 is identical to the anchor assembly illustrated as 30 or 31 except that its anchors 38 are facing in the opposite direction, that is, toward the drill rather than away from the drill. Remotely controlled valves 73 and 74 are inserted in hydraulic lines 19 and 20 and actuated by any source of power such as a battery 75, switch 76, wires 77 and 78, solenoids 79 and 80, respectively. Valves 73 and 74 are connected so that when solenoids 79 and 80 are actuated, hydraulic fluid will be cut off from pipes 18 and 15, respectively, and applied to pipes 81 and 82, respectively. Assembly 71 will function in the identical manner as either assembly 30 or 31. The hydraulic supply will be operated so that fluid applied to opposite sides will cause egagement and movement, then reengagement and utility for each reversal of the hydraulic fluid. Under the above conditions, the utility can be removed easily from any borehole.

It is obvious that other configurations and mechanical linkages can be utilized and still carry out the spirit and scope of this invention as described in the specification and the appended claims.

What is claimed is:

1. An apparatus for applying drilling pressure to a drilling apparatus *including a drill bit* in a borehole comprising a cylinder means having enclosed ends, piston means axially positioned inside said cylinder means, borehole engaging means slidably journaled to the outside of said cylinder means, hydraulic fluid conduit means coupled through said cylinder means for selectively applying hydraulic fluid to either side of said piston means, and means mechanically coupled to said piston means for actuating said borehole engaging means and applying pressure to said drilling aparatus when hydraulic fluid is applied to one side of said piston means and releasing and restoring said bore hole engaging means when said hydraulic pressure is applied to the other side of said piston means.

2. A device as described in claim 1 wherein said piston means comprises first and second pistons each having a piston rod slidably journaled through opposite ends of said cylinder means and wherein said borehole engaging means comprises first and second anchoring assemblies coupled to said first and second piston rods, respectively, whereby when said hydraulic fluid is applied between said pistons, said pistons will be forced apart anchoring one of said assemblies and releasing the second assembly, and when said hydraulic fluid is pressured on the opposite sides of said pistons, said anchored assembly will release, and said released assembly will become anchored, while pressure is being applied to said drill bit.

3. A device as described in claim 2 including a second cylinder, a third piston, and piston rod mounted in said second cylinder, means for rigidly securing said second cylinder axially to said first cylinder and spaced therefrom, a second anchoring assembly mounted on said second cylinder and actuated by said third piston rod, anchor means attached to said anchoring assembly and facing in the opposite direction from the anchor means mounted on said first-mentioned cylinder, valve means for closing off the flow of hydraulic fluid to said first-mentioned cylinder and directing same to said second cylinder whereby said second cylinder can be operated to remove said first-mentioned cylinder and said drill-out of said borehole.

4. A device as described in claim 2 wherein said anchoring assemblies each contain a first sliding support around said cylinder, a second sliding support around said piston rod, rigid means coupling said first and second supports, an anchor means pivotally attached to said rigid means, and means connecting said anchoring means to said piston rod.

5. A device as described in claim 4 wherein said anchor means comprises a plurality of anchors spaced along said rigid [support,] *means,* each anchor having a serrated wall engaging end, with the remaining end attached to said connecting means.

6. A device as described in claim 4 wherein said anchoring assemblies comprise at least three equally spaced, rigid [coupling] means each having an anchor means.

7. A device as described in claim 4 wherein said anchor means comprises a single elongated anchor.

8. An apparatus for incrementally forcing a drill bit into the earth comprising a cylinder having first and second ends, first and second pistons in said cylinder with piston rods extending axially from each of said pistons through said first and second ends, respectively, an anchoring assembly for each piston including an anchor means, a sliding mount retaining said anchor means supported between said cylinder and said piston rod and means coupled to said piston rod and to said anchor means, a first hydraulic port mounted between said pistons, and a port mounted at each end of said cylinder.

9. A device as described in claim 8 wherein said anchor means [comprises] *includes* a plurality of anchors spaced along said [rigid support] *anchor means,* each anchor having a serrated wall engaging end, with the remaining end attached to said connecting means.

10. A device as described in claim 9 wherein said anchor means [comprises] *includes* a single elongated anchor.

11. A device as described in claim 9 wherein said anchor means comprises *a rigid support,* a plurality of anchors spaced along said rigid support, each anchor having a serrated wall engaging end, with the remaining end attached to said coupling means.

12. A device as described in claim [11] *8* wherein said anchoring [assemblies comprise] *assembly comprises* at least three equally spaced, rigid coupling means each having an anchor means.

13. An apparatus for engaging a borehole and applying axial pressure to a drill bit comprising a cylinder having first and second ends, first and second pistons slidably mounted in said cylinder with first and second piston rods attached to said pistons and slidingly journaled in said first and second ends, respectively [,] *;* hydraulic fluid conduit means coupled through said cylinder for selectively applying hydraulic fluid to either side of said first and second pistons [,] *;* first and second anchoring assemblies each comprising a first mounting means slidably attached to said piston rod and a second mounting means slidably attached to said cylinder [,] *;* and anchor means having one end adapted to engage said borehole, means for pivotally attaching said anchor *means* to said first and second mounting means, and means rigidly attached to the end of said piston rod and coupled to said anchor means whereby movement of said piston in the direction of its corresponding cylinder end will cause said anchor means to be urged into engagement with said borehole wall and adding pressure will cause pressure to be applied to said drill bit.

References Cited

The following references, cited by the Examiner, are of record in the patented file of this patent or the original patent.

UNITED STATES PATENTS

| | | | |
|---|---|---|---|
| 556,718 | 3/1896 | Semmer | 175—94 |
| 1,983,287 | 12/1934 | Grinnell et al. | 175—99 X |
| 2,946,578 | 7/1960 | De Smaele | 175—62 X |
| 3,180,437 | 4/1965 | Kellner et al. | 175—230 |
| 3,185,225 | 5/1965 | Ginies | 175—98 X |
| 3,225,843 | 12/1965 | Ortloff et al. | 175—230 X |
| 3,370,657 | 2/1968 | Antle | 175—230 X |
| 3,386,520 | 6/1968 | Lawrence et al. | 175—230 |
| 3,399,738 | 9/1968 | Haspert | 175—53 |
| 3,642,326 | 2/1972 | Steufmehl | 299—31 |

DAVID H. BROWN, Primary Examiner

U.S. CL. X.R.

175—62, 99, 230